Aug. 7, 1934.    M. DUNKEL ET AL    1,969,397
PRODUCTION OF COMPOUND GLASS
Filed April 5, 1932
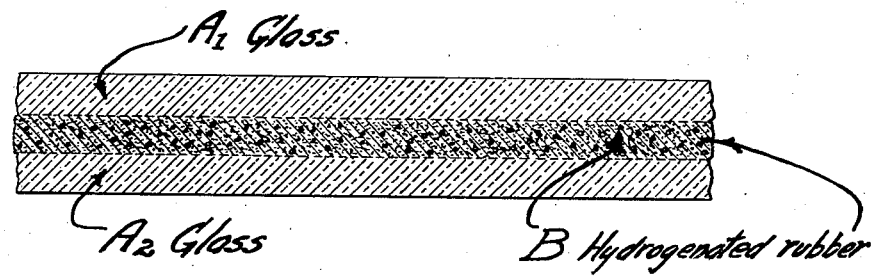
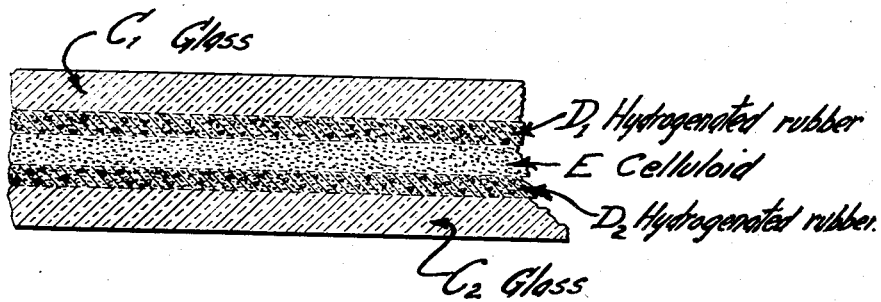
INVENTORS
MANFRED DUNKEL
WILHELM BREUERS
WALTER WOLFF.
BY Hauff+Harland ATTORNEYS.

Patented Aug. 7, 1934

1,969,397

UNITED STATES PATENT OFFICE 1,969,397

PRODUCTION OF COMPOUND GLASS

Manfred Dunkel, Cologne, Wilhelm Breuers, Ludwigshafen-on-the-Rhine, and Walter Wolff, Mannheim, Germany, assignors to I. G. Farbenindustrie Aktiengesellschaft, Frankfort-on-the-Main, Germany Application April 5, 1932, Serial No. 603,672
In Germany April 10, 1931

8 Claims. (Cl. 49—92)

The present invention relates to the production of compound glass.

It is already known that non-splintering glass or "compound glass" may be prepared by uniting two glass plates by means of an intermediate organic layer. This intermediate layer may consist of an elastic material which either adheres directly to the glass or is joined to the glass plates by means of adhesive layers.

For an intermediate layer or the like for non-splintering glass to be satisfactory in every respect, it is necessary that it should be colourless, stable to light and cold, elastic and strong and especially that it should adhere continually and firmly to the glass and to any other layers used. The intermediate layers from organic film-forming substances capable of forming self-supported films hitherto used for the preparation of non-splintering glass or compound glass, such as celluloid, cellulose acetate if desired with coatings of gelatine, fish glue, rubber or mixtures thereof with soft resins, or of dissolved collodion, have not been satisfactory as regards all the requirements, in particular their stability to cold leaves much to be desired.

We have now found that a most valuable compound glass is obtained by employing a wholly or partially hydrogenated rubber material, i. e. wholly or partially hydrogenated India rubber, balata, guttapercha or similar vegetable rubber or hydrogenated polymerization products of butadiene as the intermediate layers or as the binding agent for intermediate layers from the said other film-forming substances. These compounds, which, for the sake of brevity, will hereinafter and in the appended claims be referred to as hydro-rubber, adhere excellently to glass as well as to films of regenerated cellulose (viscose) or of cellulose esters such as nitrocellulose, or, respectively, celluloid and acetyl cellulose, cellulose butyrate or mixed esters such as cellulose acetate butyrate and cellulose nitrate acetate, or water-insoluble cellulose ethers, such as ethyl or benzyl celluloses, of polymeric acrylic esters and/or other acrylic compounds as for example the mixed polymerization products from acrylic ethyl ester and acrylic nitrile, preferably in a ratio of from about 4 to 6 parts, or from acrylic methyl ester and acrylic nitrile preferably in a ratio of from about 4 to 6 or from 3 to 7 parts, and other organic materials capable of forming self-supported films and suitable for use as intermediate layers. They are stable to light and air, extremely tough and still elastic even in solid carbon dioxide.

The invention in this case is further illustrated by the accompanying drawing, Figs. 1 and 2 of which show sections of non-splintering glass according to two modifications of applicants' invention.

On the drawing, the reference numerals $A_1$ and $A_2$ of Fig. 1 represent two glass plates joined together by a layer of hydrogenated rubber of the type indicated. The article of this figure is similar to that which will be produced by following Example 1 of the specification.

The article disclosed in Fig. 2 is similar to that which will be produced by following the process outlined in Example 2 of the specification. In this figure the reference numerals $C_1$ and $C_2$ indicate two glass plates which are joined to opposite surfaces of a layer of celluloid E by two layers of hydrogenated rubber $D_1$ and $D_2$.

The said hydro-rubber can be prepared by subjecting a natural rubber material of the aforesaid kind, preferably dissolved in a neutral solvent such as cyclohexane, decahydronaphthalene or petroleum fractions of saturated hydrocarbons boiling between 80° and 200° C., to a treatment with hydrogen at temperatures between about 240° and 350° C. and at a pressure of from about 30 to about 200 atmospheres in the presence of the usual hydrogenation catalysts such as nickel, cobalt or platinum. Depending on the initial materials and on the conditions of working, especially as regards the temperatures, different products are obtained; the products obtained when working at from about 240° to about 250° C. are solid, but sticky substances, whereas the products obtained when working at from about 275° to 340° C. are highly viscous oils, the viscosity of which decreases with the increase of temperature during the hydrogenation and in which the original rubber is considerably degraded. Solid easily kneadable masses are obtained by slowly raising the temperature from about 100° to 280° C. during the hydrogenation, these products being degraded to a lower extent than those prepared at about 280° C. throughout. The temperature for hydrogenating synthetic rubber largely depends on the nature of the initial materials. If products the solutions of which show a low viscosity, as for example a 3.5 per cent solution in cyclohexane having a relative viscosity of about 2.5, are to be hydrogenated the temperatures may be as low as from 50° to 100° C., products the solutions of which show a higher viscosity, as for example of 5 with a 3.5 per cent solution in cyclohexane, require, however, higher temperatures, such as from about 80° to about 150° C. When comparatively slightly degraded products which still have a satisfactory mechanical strength are used, they may be employed alone. One or more layers of highly degraded and therefore more readily worked hydro-rubber obtainable for example by a direct hydrogenation at about 250° C., are advantageously employed together with one or more intermediate solid films of the said other film forming materials. Even when employed in this way, the hydro-rubber is superior to the substances hitherto employed. For example it joins films of celluloid, regenerated cellulose, acetyl cellulose and the aforesaid polymerization products of unsaturated compounds to glass in a hitherto unattainable manner, these mixed products being particularly valuable. Compound glass prepared in this manner remains splinterless even at temperatures as low as 20° C. below zero and as high as 60° C. With hydro-rubber prepared from natural rubber the best results are usually obtained with a hydro-rubber the 3.5 per cent solutions of which in benzene show a relative viscosity at 25° C. of from 2 to 16 or preferably from 3 to 8.

The following examples will further illustrate the nature of this invention, but the invention is not restricted to these examples.

*Example 1*

Hydro-rubber of high molecular weight obtained by subjecting 100 parts of crêpe rubber together with 500 parts of decahydronaphthalene and 50 parts of nickel deposited on a carrier to hydrogenation in an autoclave at a temperature slowly rising in the course of 15 hours from 100° to 280° C. and at a pressure of hydrogen of from 80 to 150 atmospheres until the consumption of hydrogen has ceased is distributed after heating it to 120° C. on glass plates warmed to 50° C. so as to form a uniform layer, the operation preferably being carried out in vacuo in order to remove any air bubbles which may be present. Two plates coated in this manner are then pressed together with the layers thereon towards each other at about 80° C. and about 10 kilograms per square centimetre so that a film of about 0.2 millimetre in thickness remains. A non-splintering glass having excellent properties is obtained.

*Example 2*

A glass plate coated with hydro-rubber obtained from crêpe rubber by hydrogenation while quickly raising the temperature to about 280° C. is covered with a dry film for example of celluloid or acetyl cellulose of 0.5 millimetre thickness or of regenerated cellulose (viscose) of 0.15 millimetre thickness or of a polymerization product prepared from a mixture of 4 molecular proportions of acrylic acid methyl ester and 6 molecular proportions of acrylic acid nitrile emulsified in water, and a second glass plate coated with the said hydro-rubber is laid thereon with the hydro-rubber surface downwards. The whole is pressed together in a hot press at about 60° C. and 20 kilograms per square centimetre so that a film of from 0.1 to 0.3 millimetre in thickness remains.

*Example 3*

A film of regenerated cellulose of about 0.16 millimetre thickness is coated on both sides with a thin layer of a hydro-rubber prepared by hydrogenating at about 120° C. a polymerization product of butadiene the 3.5 per cent solution of which in cyclohexane shows a relative viscosity of 4.5, by immersion in a 40 per cent solution of the hydro-rubber in cyclohexane. The film prepared in this manner, after removal of the cyclohexane by allowing it to evaporate, is laid between two clean glass plates and the whole is pressed at about 30° C. and 20 kilograms per square centimetre. If desired, triple or quadruple compound glass can be prepared in the corresponding manner.

*Example 4*

A 40 per cent solution in cyclohexane of the hydro-rubber referred to in Example 2 is poured onto glass plates after they have been provided with a temporary protecting edge of wood or paper. The coatings are then freed from solvent in a warm current of air, if necessary while employing a vacuum for accelerating the evaporation. Either two glass plates prepared in this manner are combined under pressure at from 10 to 20 kilograms per square centimetre or one such plate is combined in the same manner with a clean glass plate. The temperature during pressing depends on the desired thickness of the intermediate layer and may be varied between 30° and 100° C.

*Example 5*

Hydro-rubber as described in Example 2 is pressed from a gap of suitable width onto glass plates continuously passed thereunder. The glass plates thus provided with a layer of hydro-rubber are pressed together at about 10 kilograms per square centimetre and at about 65° C. or with an intermediate film of other transparent material, such as celluloid, acetyl cellulose or mixed polymerization products from 4 parts of acrylic methyl ester and 6 parts of acrylic nitrile, or with a clean glass plate.

What we claim is:—

1. As a new article of manufacture, a compound glass, stable to cold, comprising at least two sheets of glass and an intermediate layer of hydro-rubber.

2. As a new article of manufacture, a compound glass, stable to cold comprising at least two sheets of glass and an intermediate layer of an organic substance capable of forming self-supported films and having on both sides a layer of hydro-rubber.

3. As a new article of manufacture, a compound glass, stable to cold, comprising at least two sheets of glass and an intermediate layer of a hydrogenated natural rubber.

4. As a new article of manufacture, a compound glass, stable to cold and comprising at least two sheets of glass and an intermediate layer of a hydrogenated synthetic rubber.

5. As a new article of manufacture, a compound glass, stable to cold, comprising at least two sheets of glass and an intermediate layer of a hydrogenated natural rubber, the 3.5 per cent solution of which in benzene shows a relative viscosity of from 2 to 16.

6. As a new article of manufacture, a compound glass, stable to cold, comprising at least two sheets of glass and an intermediate layer of a hydrogenated natural rubber, the 3.5 per cent solution of which in benzene shows a relative viscosity of from 3 to 8.

7. As a new article of manufacture, a compound glass, stable to cold, comprising at least two sheets of glass and an intermediate layer of celluloid having on both sides a layer of a hydrogenated natural rubber.

8. As a new article of manufacture, a compound glass, stable to cold, comprising at least two sheets of glass and an intermediate layer of acetyl cellulose having on both sides a layer of a hydrogenated natural rubber.

MANFRED DUNKEL.
WILHELM BREUERS.
WALTER WOLFF.